US010452690B2

(12) United States Patent
Wu

(10) Patent No.: US 10,452,690 B2
(45) Date of Patent: Oct. 22, 2019

(54) ONLINE SITES WITH ASSOCIATED FICTITIOUS GEOGRAPHICAL LOCATIONS

(71) Applicant: Bin Wu, Shanghai (CN)

(72) Inventor: Bin Wu, Shanghai (CN)

(*) Notice: Subject to any disclaimer, the term of this patent is extended or adjusted under 35 U.S.C. 154(b) by 925 days.

(21) Appl. No.: 14/736,096

(22) Filed: Jun. 10, 2015

(65) Prior Publication Data
US 2016/0364408 A1 Dec. 15, 2016

(51) Int. Cl.
*G06F 16/00* (2019.01)
*G06F 16/29* (2019.01)
*G06F 16/248* (2019.01)
*G06F 16/28* (2019.01)
*G06F 16/955* (2019.01)
*G06F 16/958* (2019.01)
*H04L 29/08* (2006.01)
*G06F 16/9537* (2019.01)

(52) U.S. Cl.
CPC ............ *G06F 16/29* (2019.01); *G06F 16/248* (2019.01); *G06F 16/284* (2019.01); *G06F 16/955* (2019.01); *G06F 16/958* (2019.01); *G06F 16/9537* (2019.01); *H04L 67/10* (2013.01)

(58) Field of Classification Search
CPC .... G06F 16/29; G06F 16/9537; G06F 16/958; G06F 16/248; G06F 16/284; G06F 16/955; H04L 67/10
See application file for complete search history.

(56) References Cited

U.S. PATENT DOCUMENTS

| 9,047,315 | B1 | 6/2015 | Gildfind et al. |
|---|---|---|---|
| 2009/0210301 | A1 | 8/2009 | Porter et al. |
| 2009/0300493 | A1 | 12/2009 | Hamilton et al. |
| 2010/0162149 | A1 | 6/2010 | Sheleheda et al. |
| 2012/0001939 | A1 | 1/2012 | Sandberg |
| 2012/0198359 | A1 | 8/2012 | Lossia |
| 2012/0278438 | A1 | 11/2012 | Mitchell |
| 2012/0290616 | A1 | 11/2012 | Lee |
| 2013/0111367 | A1 | 5/2013 | Park et al. |

(Continued)

OTHER PUBLICATIONS

International Search Report and Written Opinion for Application No. PCT/US2016/034845, dated Aug. 31, 2016, 14 pages.

(Continued)

*Primary Examiner* — Paul Kim
(74) *Attorney, Agent, or Firm* — Sheppard Mullin Richter & Hampton LLP

(57) ABSTRACT

A method, which provides a location context to an online object, includes (a) receiving identification information regarding the online object; (b) in a database, creating a relationship between the online object and a representation of a geographical location; (c) receiving a request for retrieving the relationship from the database based on the identification information or the geographical location; and (d) responding to the request by returning the relationship retrieved from the database. The request may originate from an application program that displays the representation of the geographical location graphically. The online object may correspond to an online business. In some implementations, the online object is unrelated in real life to a community located at the geographical location.

28 Claims, 5 Drawing Sheets

(56) References Cited

U.S. PATENT DOCUMENTS

2014/0297617 A1    10/2014   Rajakarunanayake et al.
2014/0365476 A1*   12/2014   Rajakarunanayake ..................... G06F 17/3087
                                                                    707/724

OTHER PUBLICATIONS

European Supplementary Search Report dated Sep. 25, 2018, issued in related European Application No. 16808034.9 (8 pages).
PCT International Preliminary Report on Patentability dated Dec. 21, 2017, issued in related International Application No. PCT/US2016/034845 (7 pages).

* cited by examiner

ONLINE SITES WITH ASSOCIATED FICTITIOUS GEOGRAPHICAL LOCATIONS

BACKGROUND OF THE INVENTION

1. Field of the Invention

The present invention relates to activities on the internet, whether they are commercial, non-commercial or business activities. In particular, the present invention relates to associating commercial, non-commercial, or business activities on the Internet with geographical locations.

2. Discussion of the Related Art

The Internet has brought more and more of our daily activities into a virtual or online world. In the online world, information is represented by binary data that can be transported around the globe reliably at great speed and practically at no cost. Such information is stored, analyzed and retrieved with great efficiency. For example, when a customer carries out a text-based online chat session with a customer service representative, a record of that conversation (e.g., a transcript) can be preserved for later retrieval and analysis a long time after the time of the conversation. Had the conversation occurred in person, or over a telephone call, preservation of that conversation for subsequent retrieval would not be a simple task. (You can certainly argue that there is potential danger and evil in the ability to accurately and permanently record such events for later use; there are certainly reasons for their judicious use and to guard against abuse zealously.)

Even in the online world, there is often a need to refer to the real physical world. For example, many online sites or mobile application programs ("apps") support location-based services ("LBS"). For example, when a user whose geographical location is known searches for a coffee shop on an online map (e.g., an on-line map website or app), the on-line map would preferentially show coffee shops in the user's local area, such as illustrated in FIG. 1. When such a search is performed on a mobile device (e.g., a cellular telephone), the search results are typically automatically prioritized according to distance from the mobile device's current geographical location. To determine the current location, the mobile device typically includes a global positioning system (GPS) receiver or a comparable location determination component in the mobile device. Using the current location so determined, an LBS server then accesses a database that "geo-tags" merchants or businesses with their positions expressed, for example, in GPS coordinates. Geo-tagging is also widely used with photographs. To geo-tag a photograph, a camera in a GPS-equipped or position-aware mobile device (e.g., a cellular telephone) includes in the photograph's image file the mobile device's position at the time the photograph is taken. In fact, today's professional cameras are likely to be equipped with a built-in GPS unit. Such a camera embeds its current geographical location by default into the image file whenever a photograph is taken.

LBS or geo-tagging methods have been used for many years. In general, however, their uses have been limited because of many disadvantages. First, a user's current location may implicate serious privacy concerns. Once a person's true current geographical location becomes accessible online, that information is vulnerable to being sniffed, hijacked, misappropriated, taken advantage of or otherwise abused. Second, frequent use of the GPS module in a mobile device drains precious battery power. Third, an industry standard GPS receiver does not work very well inside buildings, especially in a multi-story building. Much effort has been focused on developing "indoor GPS". In indoor GPS, indoor positions may be determined using known positions of WiFi access points (hotspots). There are a diverse variety of methods for performing indoor positioning. However, none of these methods are completely satisfactory yet.

For businesses, using an office location as the online LBS location of a business seems straightforward, but there are often complications. For example, in a high-rise office building, or in a multi-level indoor mall, many businesses share the same planar position (i.e., same latitude and longitude coordinates), even though they can be distinguished on the basis of altitude or elevation. Positions of these businesses thus overlap in a 2-D or aerial-view map. A 3-D rendering, or a 2-D rendering augmented by discrete levels, is simply too involved. For small home-based businesses, using the actual geographical location would reveal a home address, which implicates privacy and safety concerns. However, to establish an office address merely to insulate the home from the business may be costly.

Some on-line applications are based on imaginary locations in virtual worlds. FIGS. 2(a) and 2(b) illustrate uses of imaginary locations in a virtual world in 3-dimensional and 2-dimensional renditions, respectively. In some applications, for example, a user in a virtual world may be represented by an avatar, which is allowed to freely roam the virtual world. A treasure hunting game is an example of such an application. Such applications, which allow for great creative and artistic expressions, are typically found in gaming, social media, and education. However, many techniques developed for virtual worlds are not used in applications related to the actual geographical locations in the real physical world.

SUMMARY OF THE INVENTION

According to one embodiment of the present invention, a method provides a location context to an online object. The method includes (a) receiving identification information regarding the online object; (b) in a database, creating a relationship between the online object and a representation of a geographical location; (c) receiving a request for retrieving the relationship from the database based on the identification information or the geographical location; and (d) responding to the request by returning the relationship retrieved from the database. The request may originate from an application program that displays the representation of the geographical location graphically. The online object may correspond to an online business. In some implementations, the online object is unrelated in real life to a community located at the geographical location.

In one embodiment, the creator of a relationship corresponds to an online business which systematically relates online objects to fictitious locations. The fictitious location is specified by a real life location expressed in latitude and a longitude, and optionally an altitude. The database further includes both relationships between real objects and geographical locations and online objects and geographical locations. To distinguish between real entities and virtual entities, the creator may enforce a policy that restricts the relationships of the online objects to geographical locations of public areas. In that implementation, the public areas may include sidewalk, public parks, public lands, on streets, on throughways, or underground.

In one embodiment, the online objects in the database form a virtual community, such as a virtual bazaar.

The relationship is created in the database by a server, which operates a user interface that is implemented in a website or a mobile application program. In one embodiment, the server may conduct one or more of the following activities: online commerce of goods or services, classified advertisement, advertising, information sharing or exchange, online publishing of articles or books, online communications, or online socializing. The user interface may allow a user to explore a local community using an avatar. The local community may be entirely virtual, i.e., a community which does not correspond to a community in the real world.

The present invention provides a systematical way for associating on-line entities with physical, geographical locations on a semi-permanent, immobile, real estate-like manner.

The present invention is better understood upon consideration of the detailed description below, in conjunction with the accompanying drawings.

DETAILED DESCRIPTION OF THE PREFERRED EMBODIMENTS

Figure 1:
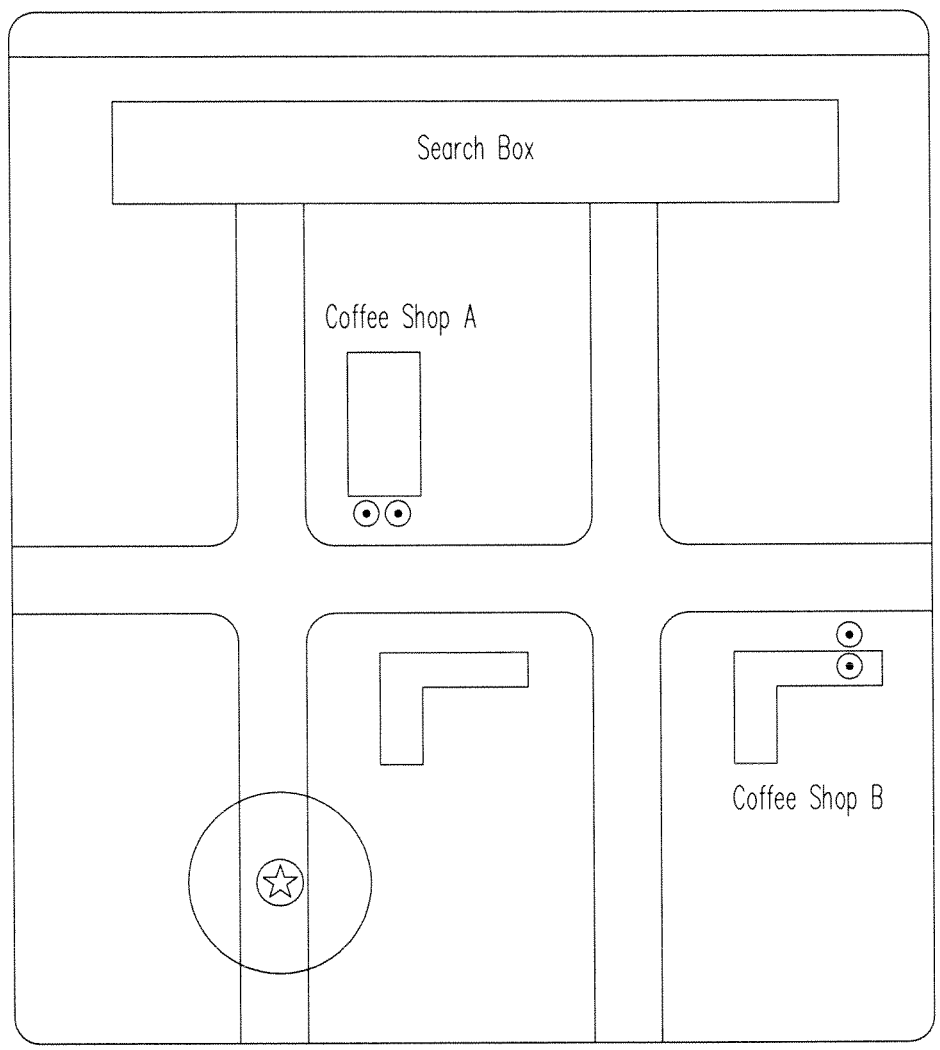
FIG. 1 shows a map used in a typical location-based service, representing businesses locations at or near an actual geographical position.
Figure 2A:
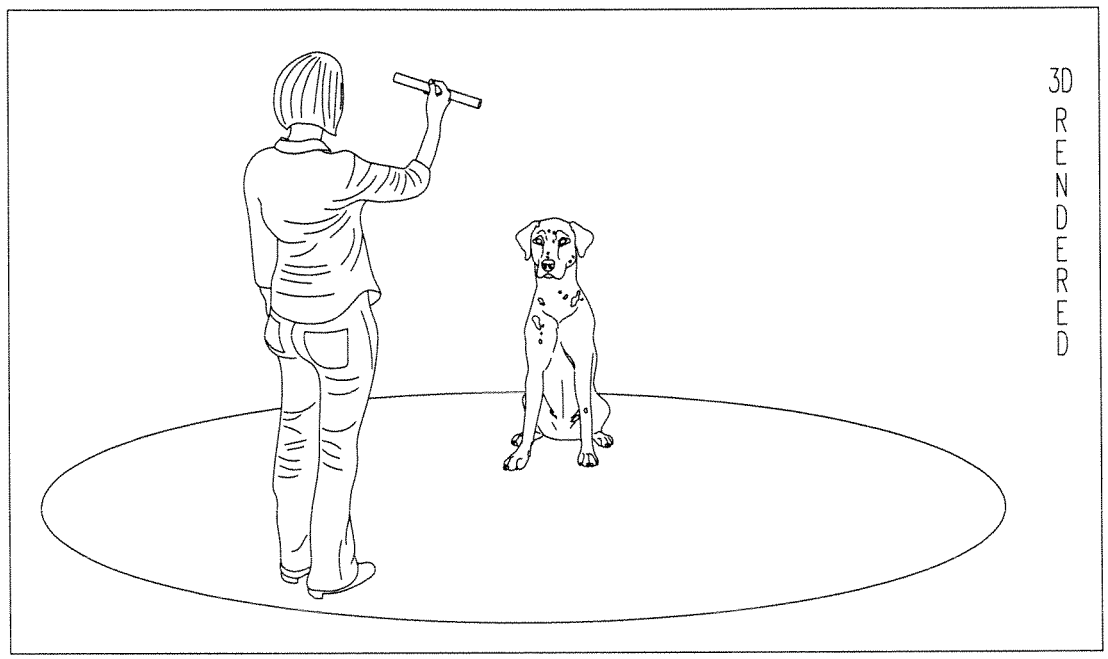
FIGS. 2(*a*) and 2(*b*) illustrate uses of imaginary locations in a virtual world in 3-dimensional and 2-dimensional renditions, respectively.
Figure 2B:
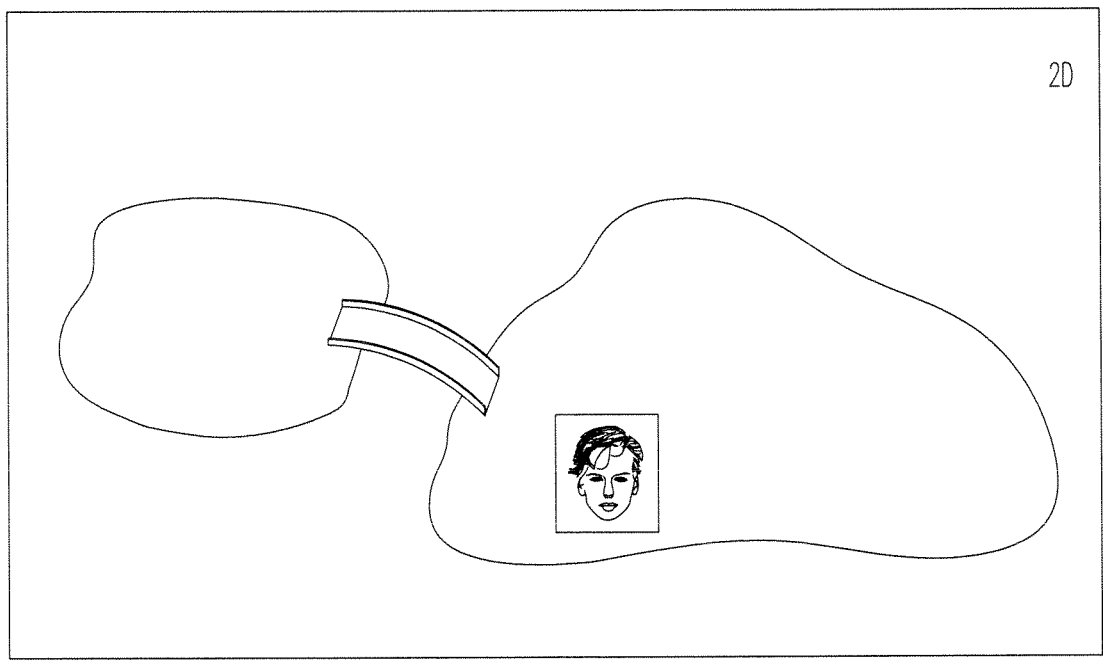
Figure 3:
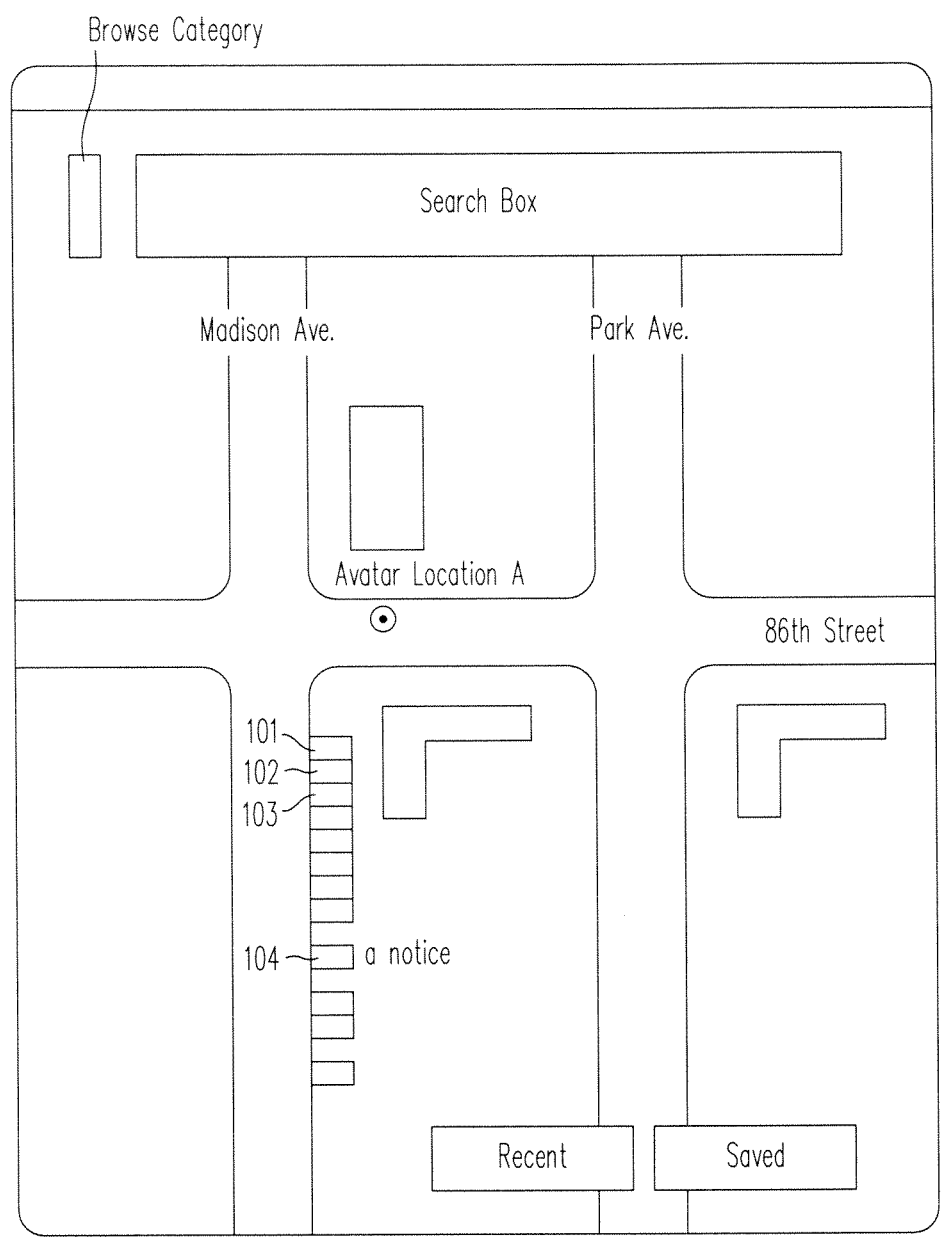
FIG. 3 illustrates providing a local geographical context to virtual businesses, in accordance with one embodiment of the present invention.

The present invention associates a virtual element (e.g., an online business) with a local context that is based at least in part on one or more real geographical locations. FIG. 3 illustrates providing a local geographical context to virtual or online businesses, in accordance with one embodiment of the present invention. As shown in FIG. 3, locations labeled 101, 102, 103 and 104 correspond to locations on a sidewalk of a city block. Real businesses or virtual on-line websites may be associated in an on-line database with the actual geographical locations on the sidewalks of the city block. Of course, for virtual elements, that association is completely artificial. In this detailed description, on-line locations may be artificially associated with real or virtual elements in an online database; such on-line locations are referred to as the "fictitious locations" of these elements. Fictitious locations may correspond to actual geographical locations in the real world. Imagine a hot dog stand on a sidewalk, or a note regarding a beloved pet that's lost posted on a lamp pole of a street light. Fictitious locations are the online equivalents for the geographical positions of the side walk or the lamp post. In FIG. 3, for example, fictitious location 101 is associated with an on-line specialty beer vendor, fictitious location 102 may be associated with a real cafe actually located physically nearby fictitious location 102, and fictitious location 103 is associated with an actual person who provides babysitting service in the neighborhood—though not physically present at the geographical location corresponding to fictitious location 103—and fictitious location 104 is associated with a posted note regarding a lost dog, although no such note is actually posted at the actual geographical location corresponding to fictitious location 104.

By associating a fictitious location to an online business, the present invention allows the online business to be included by a search application looking for businesses in the vicinity of the location corresponding to the on-line business's fictitious location. In the prior art, to be included in the search result, an on-line business often needs to buy keywords in one or more search engines (i.e., pay one or more search engines to include the on-line business in the search results, when a query that includes the keyword is received). Often, to capture the business in a specific community, the on-line business buys the locations of the community and related descriptions as keywords. Such keyword buying is obviated when the on-line business is deemed associated geographically with the specific community directly through its fictitious location. A method of the present invention helps small on-line businesses become local businesses, e.g., by associating a small mail-order business to locations of a specifically targeted community. At the same time, a method of the present invention simplifies the process by which local businesses become on-line businesses, e.g., by allowing a babysitting service to serve the local community without revealing where the service provider is actually located. Given that many consumers prefer to use local service providers, the present invention provides advantages to localized on-line businesses, as they compete with large on-line giants, such as amazon, taobao.com and others.

Figure 4:
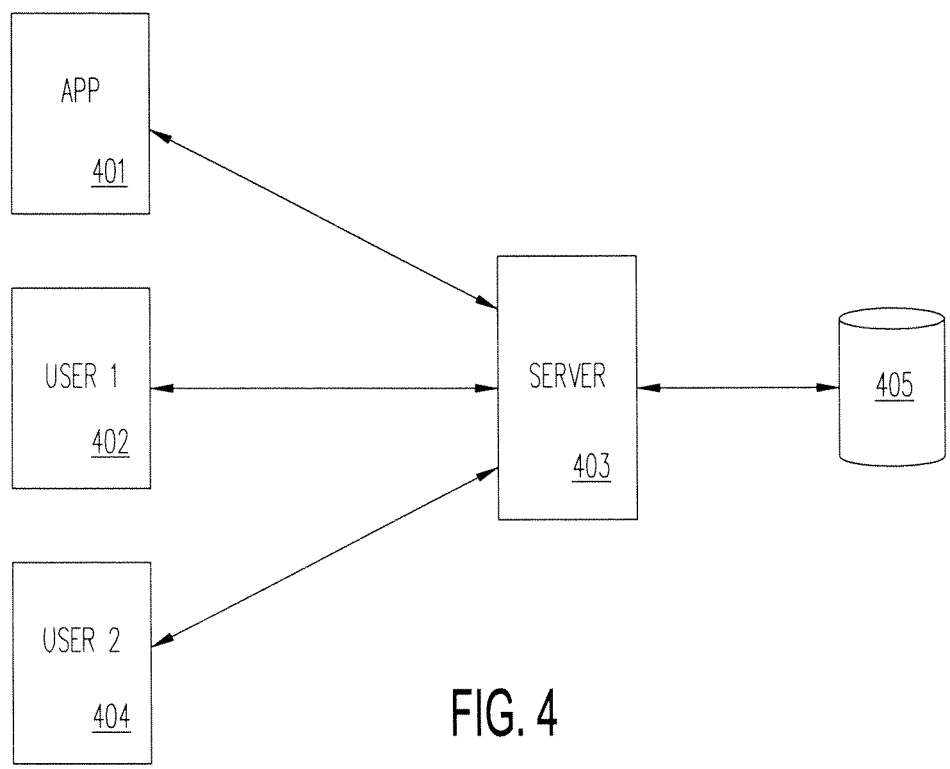
FIG. 4 shows one implementation of a service that provides association of fictitious locations to real or on-line entities, in accordance with one embodiment of the present invention.

A method of the present invention is flexible and may be easily implemented using conventional computing devices and internet connections, as readily available to any creator of online information, online host or business owner. FIG. 4 shows one implementation of a service that provides association of fictitious locations to real or on-line entities, in accordance with one embodiment of the present invention. As shown in FIG. 4, server maintains a database 405 which associates fictitious locations to both entities with an actual location and virtual entities that exist only on-line. Such associations may be created by authorized personnel of the real and virtual entities through an application software (e.g., app 401), or alternatively, by a website interface of server 403. These associations are provided to user apps 402 and 404 when they query database 405 through server 403. User apps 402 and 404 may be application software running on mobile devices, e.g., search engines, map applications or other software providing LBS-type services. Alternatively, user apps 402 and 404 may be web pages served by server 403 to provide search engine, maps or other LBS-type services. Because of the ease of implementation and low capital requirements, the present invention facilitates a fictitious geographical presence in the online world, hence enabling businesses that are even smaller than what is conventionally considered small businesses, specialty businesses or niche businesses. By attaching a fictitious location to an on-line entity, the present invention provides a neighborhood context to online activities, without imposing undue restrictions or intruding into privacy.

A method of the present invention may also benefit personal sites that are created to facilitate social interactions with people, to disseminate ideas, to express oneself, even without a commercial motive. In one application, a user from anywhere on the globe may ask to virtually visit a geographical location, so as to interact with members of the local community to thereby experience local culture and preferences. By virtually visiting a geographical location, say Athens, Greece, using an avatar, the user may obtain a feel for how the local people live on a specific street or neighborhood in Athens, accessing local information around there. For such an application, language translation built into the system may be particularly useful. Alternatively, the user may filter sites with a language tag to limit the websites to be visited to those targeting English speakers. Such an application is akin to walking down a street in Athens, except that the travel is instantaneous. Such a travel experience will also have an element of serendipity, just as in a real life travel experience.

Figure 5:
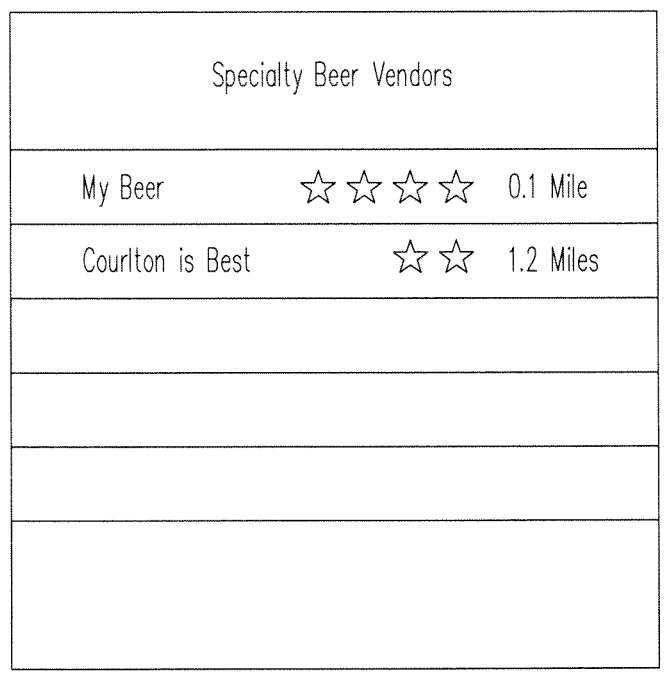
FIG. 5 shows a list of fictitious locations in order of increasing distance from the current location, in accordance with one embodiment of the present invention.
Figure 6:
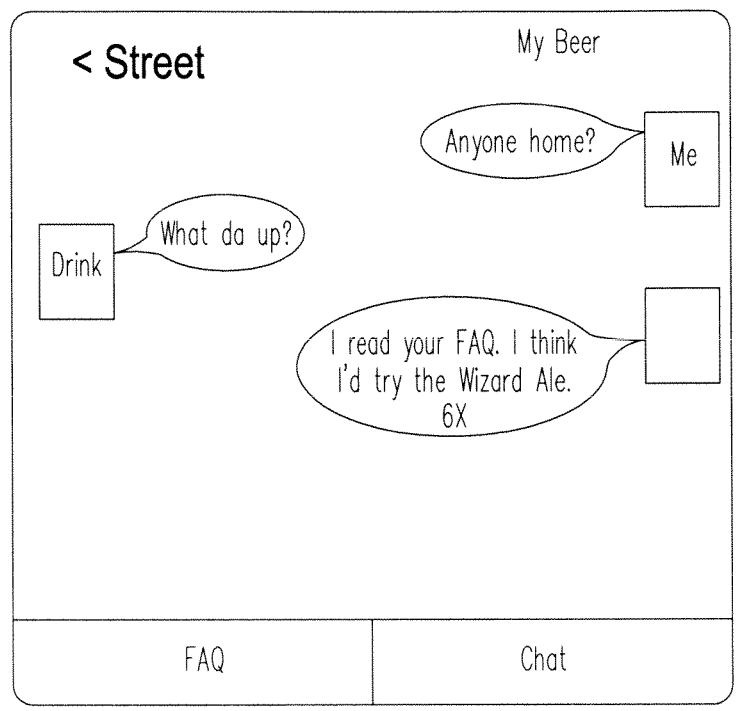
FIG. 6 shows a chat session opened as a result of the user exploring the "My Beer" site of FIG. 5, according to one embodiment of the present invention.

There are many ways to explore a website supporting fictitious locations. One way to access information in such a website is by browsing the model of the neighborhood of the fictitious location (i.e., the equivalent of walking down a street in the physical world). Another way is by picking through a hierarchy of categories, starting from where the user's avatar is located. FIG. 5 shows a list of fictitious locations in order of increasing distance from a device's current location, in accordance with one embodiment of the present invention. The list of FIG. 4 may be the result of a search query on the keyword "microbrewery", for example. As shown in FIG. 5, each business associated with the fictitious locations may be selected from the list and explored. For example, the current fictitious location corresponds to "My Beer" with a 4-star rating. Clicking on "My Beer" allows the user to explore My Beer's offerings. FIG. 6 shows a chat session opened as a result of the user exploring the "My Beer" site of FIG. 6, according to one embodiment of the present invention. In this instance, My Beer may or may not have an actual geographical location, but it does sell beer or other merchandises on-line. As shown in FIG. 6, the user makes a purchase with an agent. Other familiar formats suitable for location-based applications may also be provided. For example, rather than provided a list of search results, the local map showing the fictitious locations of the websites returned as landmarks may be displayed. A user may browse through the results on the map by clicking on the landmarks. In FIG. 6, a "FAQ" (i.e., frequently asked questions) tab provides visitors with product information, delivery or pick-up options, store hours, payment form accepted or other information.

Figure 7:
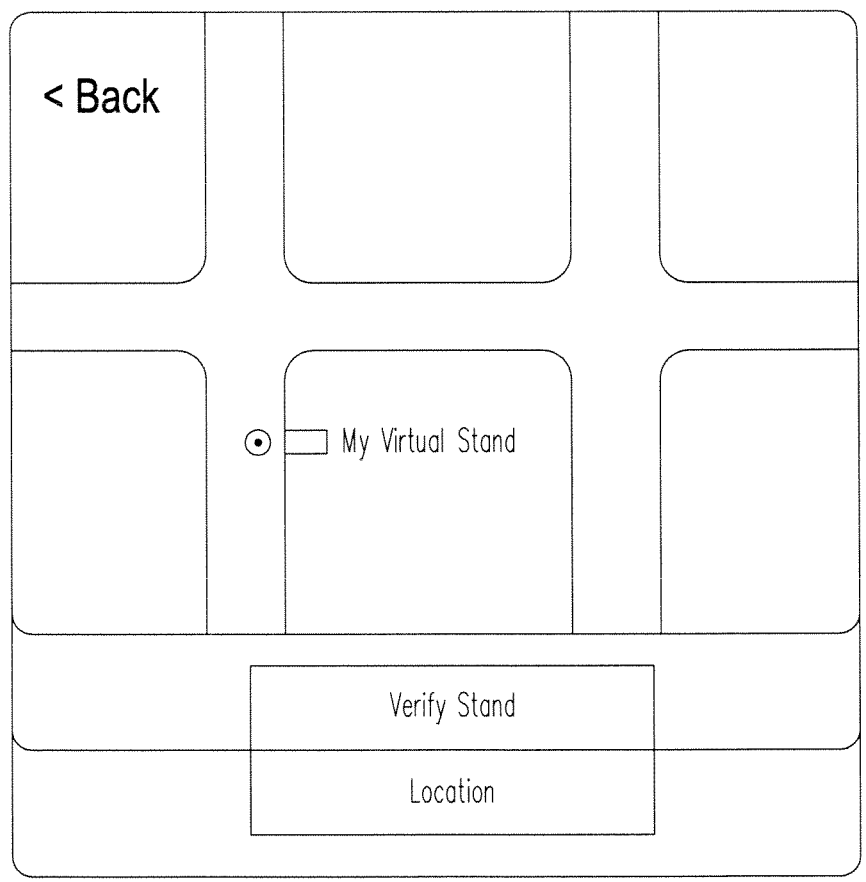
FIG. 7 shows a screen-shot of an application program running on a mobile device, which verifies a user check-in at a fictitious location, in accordance with one embodiment of the present invention.

It may be advantageous for an application to have a set of rules to govern transactions and user behavior, for example. Such rules or policies may be essential to ensure good citizenship and to prevent fraud. In one instance, for example, before a business is allowed to be associated with a fictitious location, the system may require the business owner to show a real-life connection to a local community represented by the fictitious location. Whether such a rule should be strictly or loosely enforced depends on the particular application and on the particular local culture of the community. For example, the system may require a user claiming a fictitious location to check-in periodically (e.g., once a month) with his cellular telephone from the corresponding geographical location. Exemptions may be made under some circumstances (e.g., for a babysitting service or a mobile hair dresser, where the local connection is self-evident). Suitable rules helps in ensuring and maintaining a quality on-line community. FIG. 7 shows a screen-shot of an application program running on a mobile device, which verifies a user check-in at a fictitious location, in accordance with one embodiment of the present invention. In FIG. 7, the current actual geographical location of the mobile device is indicated. When the current location coincides with the fictitious location to be verified (i.e., the fictitious location to which his business is assigned), the user selects the button labeled "Verify Stand" to satisfy the verification requirement of the virtual community.

The above detailed description is provided to illustrate specific embodiments of the present invention and is not intended to be limiting. Numerous variations or modification within the scope of the present invention are possible. The present invention is set forth in the following claims.

I claim:

1. A method for managing a relationship between an online business and a geographical location, comprising:
   receiving, from a first user, a request for creating the relationship between the online business and the geographical location, the request comprising identification information regarding the online business;
   creating, in a database, a relationship between the online business and a representation of the geographical location, the relationship associating the geographical location with the online business as a fictitious location of the online business;
   periodically receiving, from a mobile device associated with the first user, a current geographical location of the mobile device determined by a location determination component in the mobile device;
   verifying the fictitious location of the online business by determining that the received current geographical location of the mobile device is in proximity to the fictitious location of the online business;
   receiving a search query for businesses in the vicinity of the geographical location; and
   responding to the search query by returning information associated with the online business along with information associated with one or more businesses each having a real address in the vicinity of the geographical location, wherein the returning the information associated with the online business is based on the created relationship and the verifying the fictitious location of the online business.

2. The method of claim 1, wherein the search query originates from an application program that displays the representation of the geographical location graphically.

3. The method of claim 1, wherein the entity is an online business does not have a business address at the geographical location.

4. The method of claim 1, wherein the returned information makes the entity appear to be located at the geographical location or to provide a service to a community in the vicinity of the geographical location.

5. The method of claim 1, wherein the first user corresponds to an online business that systematically relate online objects to fictitious locations.

6. The method of claim 1, wherein the representation of the geographical location is specified by a latitude and a longitude.

7. The method of claim 6, wherein the geographical location is further specified by an altitude.

8. The method of claim 1, wherein the database further comprises both relationships between real objects and geographical locations and online objects and geographical locations, and wherein, in the relationships of the online objects, the geographical locations are limited to public areas.

9. The method of claim 8, wherein the public areas are selected from the group consisting of sidewalks, public parks, public lands, on throughways, or underground.

10. The method of claim 8, wherein the online objects in the database form a virtual community.

11. The method of claim 10, wherein virtual community comprises a virtual bazaar.

12. The method of claim 1, wherein the relationship is created in the database by a server, having a user interface that is implemented in a website or a mobile application program.

13. The method of claim 12, wherein the server conducts one or more of the following activities: online commerce of goods or services, classified advertisement, advertising, information sharing or exchange, online publishing of articles or books, online communications, or online socializing.

14. The method of claim 12, wherein the user interface allows a user to explore a local community using an avatar.

15. The method of claim 14, wherein the local community comprises a virtual community.

16. A system comprising:
one or more user interfaces;
a database; and
a server operating the user interfaces and the database, wherein the server:
receives, from a first user, a request for creating the relationship between the online business and the geographical location, the request comprising identification information regarding the online business;
creates in the database a relationship between the online business and a representation of the geographical location, the relationship associating the geographical location with the online business as a fictitious location of the online business;
periodically receives, from a mobile device associated with the first user, a current geographical location of the mobile device determined by a location determination component in the mobile device;
verifies the fictitious location of the online business by determining that the received current geographical location of the mobile device is in proximity to the fictitious location of the online business;
receives a search query for businesses in the vicinity of the geographical location; and
responds to the search query by returning information associated with the online business along with information associated with one or more businesses each having a real address in the vicinity of the geographical location, wherein the returning the information associated with the online business is based on the created relationship and the verifying the fictitious location of the online business.

17. The system of claim 16, wherein the search query originates from an application program that displays the representation of the geographical location graphically.

18. The system of claim 16, wherein the online business does not have a business address at the geographical location.

19. The system of claim 16, wherein the returned information makes the entity appear to be located at the geographical location or to provide a service to a community in the vicinity of the geographical location.

20. The system of claim 16, wherein the first user corresponds to an online business that systematically relate online objects to fictitious locations.

21. The system of claim 16, wherein the representation of the geographical location is specified by a latitude and a longitude.

22. The system of claim 21, wherein the geographical location is further specified by an altitude.

23. The system of claim 16, wherein the database further comprises both relationships between real objects and geographical locations and online objects and geographical locations, and wherein, in the relationships of the online objects, the geographical locations are limited to public areas.

24. The system of claim 23, wherein the public areas are selected from the group consisting of sidewalks, public parks, public lands, on throughways, or underground.

25. The system of claim 23, wherein the online objects in the database form a virtual community.

26. The system of claim 25, wherein virtual community comprises a virtual bazaar.

27. The system of claim 16, wherein the user interfaces are each implemented in a website or a mobile application program.

28. The method of claim 1, wherein the returning the information associated with the online business comprises providing for display a map of an area including the geographical location showing the entity at the geographical location.

* * * * *